A. H. CHAPLIN.
Revolving Horse Rake.
No. 36,992.
Patented Nov. 25, 1862.
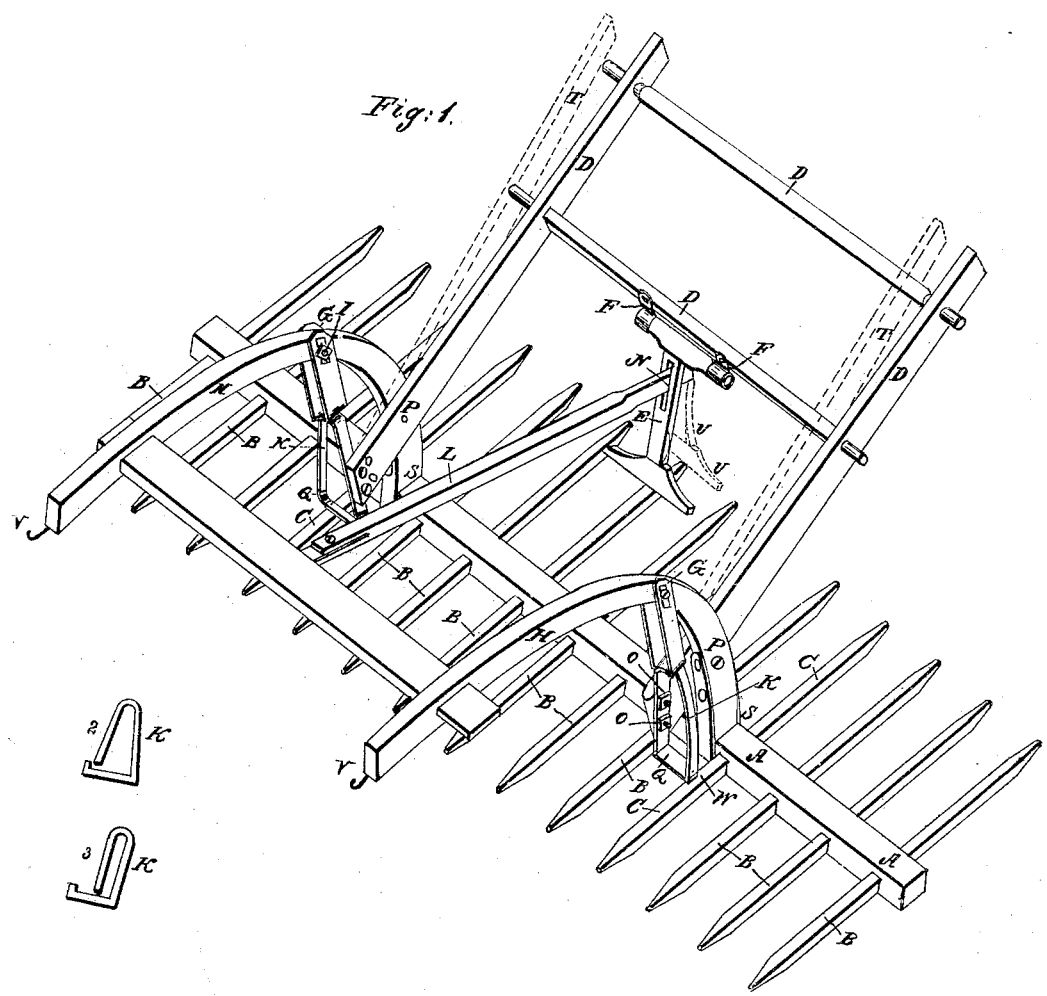

UNITED STATES PATENT OFFICE.

ATLAS H. CHAPLIN, OF ADRIAN, MICHIGAN.

IMPROVEMENT IN HORSE-RAKES.

Specification forming part of Letters Patent No. 36,992, dated November 25, 1862.

*To all whom it may concern:*

Be it known that I, ATLAS H. CHAPLIN, of Adrian, Lenawee county, Michigan, have invented a new and useful Improvement in Horse-Rakes; and I do hereby declare that the following is a full and exact description thereof, reference being had to the accompanying drawings, and to the letters of reference marked thereon.

The nature of my invention consists in attaching to shafts of an ordinary revolving horse-rake a yoke with slots therein, the object of which is to adjust the shafts to any height desired, and also a steel spring to the handles of the same, all of which are clearly described hereinafter.

Figure 1 of the accompanying drawings is a perspective view, exhibiting its several parts—viz., head A, teeth B and C, handles D D, pendulum E, hinges F F, yokes G G, springs Q Q, shafts H H, pitman L, and hooks V.

Figs. 2 and 3 exhibit one of the springs Q removed from the rake, for the purpose of explaining more clearly than could otherwise be done. The head A is made round at the places where the shafts H H are attached thereto, at R R. The shafts are attached to the head by means of an iron strap that surrounds the head and is bolted to the shafts at S S, leaving the head free to revolve. The yokes G G are attached to shafts H H by means of bolts I I, said bolts playing through slots seen in said yokes. The handles D D are attached to the shafts H H by means of pivots P P. The springs Q Q are bolted to the handles D D at O O in a suitable position for their lower ends to rest on the teeth C C at W W, and their upper ends support the yokes G G. The pitman L is hinged to the pendulum E and shafts H H at M and N.

I will describe the operation of my rake as follows: The horse is attached thereto by means of hooks V V, and when the rake has been drawn till the teeth have been filled the operator raises the handles D D to the position of the dotted lines T T, which in turn causes pendulum E to oscillate on its hinges F F by means of pitman L to the position of the dotted lines U U, which removes the lower end of the pendulum from over the ends of the teeth, and at the same time the handles are being raised the springs Q Q strike the teeth C C at W, thereby pressing down the forward end of the teeth sufficient to make them catch in the ground, which makes the head revolve as the rake is drawn along. Then, while the head A is revolving, the teeth C C strike the springs Q Q at K, thereby depressing the springs, as seen in Fig. 3, and as the teeth pass by the end of the springs they spring back over the teeth, as seen in Fig. 1.

After having thus described my invention, what I claim, and desire to secure by Letters Patent, is—

The yokes G G and springs Q Q, arranged to work in joint operation with handles D D, shafts H H, and teeth C C, as above described and set forth.

ATLAS H. CHAPLIN.

Witnesses:
FRANCES SMITH,
DANIEL C. SMITH.